(12) United States Patent
O'Sullivan

(10) Patent No.: US 12,071,062 B1
(45) Date of Patent: Aug. 27, 2024

(54) APPARATUS AND METHOD FOR A CLIMATE CONTROLLED CABINET ONBOARD A VEHICLE

(71) Applicant: Wonder Group, Inc., New York, NY (US)

(72) Inventor: Andrew William O'Sullivan, Brooklyn, NY (US)

(73) Assignee: WONDER GROUP, INC., New York, NY (US)

( * ) Notice: Subject to any disclaimer, the term of this patent is extended or adjusted under 35 U.S.C. 154(b) by 372 days.

(21) Appl. No.: 17/585,538

(22) Filed: Jan. 26, 2022

(51) Int. Cl.
*B60P 3/00* (2006.01)
*B60H 1/00* (2006.01)
(Continued)

(52) U.S. Cl.
CPC .......... *B60P 3/205* (2013.01); *B60H 1/00014* (2013.01); *B60H 1/0073* (2019.05);
(Continued)

(58) Field of Classification Search
CPC ... B60P 3/205; B60H 1/0073; B60H 1/00014; B60H 1/00792; B62D 33/042; B62D 33/048; F16B 5/0052; A47F 5/0876; A47F 5/0037; A47F 5/12; A47F 5/16; A47F 5/101; A47F 1/12; A47F 2005/165; A47B 57/16; A47B 57/545; A47B 57/04; A47B 57/40; A47B 57/20; A47B 57/26; A47B 47/0083; A47B 96/024; A47B 96/021; A47B 96/068
USPC ... 312/401, 408, 351, 35, 72, 116, 126, 128, 312/132, 140; 248/220.21, 224.8, 225.11, 248/225.21; 211/175, 187, 90.03, 90.02, 211/190, 103, 134, 150, 90.04, 153; 108/147.16, 105, 109, 107
See application file for complete search history.

(56) References Cited

U.S. PATENT DOCUMENTS 1,782,344 A * 11/1930 Gourley ................. A47B 47/03
312/351
3,929,371 A * 12/1975 Gibson ................... B60P 7/135
296/24.44
(Continued)

FOREIGN PATENT DOCUMENTS

CN 109984463 A * 7/2019
WO WO-9632914 A1 * 10/1996 ............. A47B 31/00

OTHER PUBLICATIONS

Avantco Bun Pan Rail, Jan. 12, 2022.

*Primary Examiner* — Janet M Wilkens
(74) *Attorney, Agent, or Firm* — King & Spalding LLP

(57) ABSTRACT

A climate controlled food storage system onboard a vehicle comprises a cabinet with one or more compartments. Within the one or more compartments are a pair of front pilasters and a pair of rear pilasters. The front pilasters have fasteners for locking rails or shelves into place so that they will not move when the vehicle is in motion. The rear pilasters have slots that allow the rails or shelves to be easily inserted, removed, and adjusted within the cabinet. The pilasters maximize the use of space within the cabinet while permitting adequate air flow within the cabinet. The fasteners on the front pilasters and the slots on the rear pilasters are arranged symmetrically along the vertical length of the pilasters so that they can be used interchangeably on the left and right sides of the cabinet.

17 Claims, 9 Drawing Sheets

(51) Int. Cl.
*B60P 3/20* (2006.01)
*B62D 33/04* (2006.01)

(52) U.S. Cl.
CPC ....... *B60H 1/00792* (2013.01); *B62D 33/042* (2013.01); *B62D 33/048* (2013.01)

(56) References Cited

U.S. PATENT DOCUMENTS

| | | | | |
|---|---|---|---|---|
| 4,575,164 | A * | 3/1986 | Pinnow | A47B 57/404 |
| | | | | 211/126.15 |
| 5,806,417 | A * | 9/1998 | Whiten | A47F 7/285 |
| | | | | 108/106 |
| 2006/0016774 | A1 * | 1/2006 | Bustos | A47B 96/1466 |
| | | | | 211/186 |
| 2006/0076304 | A1 * | 4/2006 | Kainuma | A47F 3/00 |
| | | | | 211/187 |
| 2014/0091696 | A1 * | 4/2014 | Welker | A47F 5/101 |
| | | | | 211/153 |
| 2015/0102718 | A1 * | 4/2015 | Liu | F25D 23/00 |
| | | | | 312/405 |
| 2017/0259648 | A1 * | 9/2017 | Putcha | B60P 3/007 |
| 2018/0132609 | A1 * | 5/2018 | Knighton | B62B 3/003 |
| 2020/0015586 | A1 * | 1/2020 | Romantic | A47F 5/0031 |

* cited by examiner

APPARATUS AND METHOD FOR A CLIMATE CONTROLLED CABINET ONBOARD A VEHICLE

TECHNICAL FIELD

Embodiments of the technology relate generally to a climate controlled cabinet system onboard a vehicle.

BACKGROUND

The popularity of food take-out and food delivery services continues to grow. The ability to prepare food for a customer during the delivery process can ensure that the customer receives the food in the optimal condition. In other words, customers prefer to receive their food in a fresh and/or hot condition. However, preparing food during the delivery process requires vehicles that are equipped with cooking systems, such as an oven, a fryer, and/or a rethermalizer, as well as food storage systems. The food storage systems can be climate controlled to maintain the food at a desired warm or cool temperature. The food storage systems can be used to store a variety of items, including food prepared prior to loading on the vehicle, ingredients for preparing food onboard the vehicle, and food that has been prepared on the vehicle.

There are several challenges associated with food storage systems used onboard vehicles that prepare food. First, space onboard the vehicle is at a premium because preparing food onboard the vehicle requires cooking and food preparation equipment, workspaces, storage space for a variety of supplies, and food storage equipment. Second, because the vehicle will be in motion at certain times, the food storage systems must be able to store food securely so that it is not ruined by the motion of the vehicle. Third, the food storage systems should be flexible and easy to use for the personnel operating the vehicle and preparing the food. Accordingly, an improved food storage system that addresses one or more of the foregoing problems would be beneficial.

SUMMARY

The present disclosure is generally directed to climate controlled food storage systems onboard a vehicle. While examples described herein refer to a climate controlled food storage system onboard a vehicle, it should be understood that the described improvements also can apply to food storage systems that are not climate controlled or food storage systems that are not onboard a vehicle. In one example embodiment, the climate controlled food storage systems can comprise a cabinet forming a cavity with front and rear pilasters positioned within the cabinet. The left and right front pilasters can be coupled to an interior surface of the cabinet and each of the left and right front pilasters can comprise a plurality of fasteners. Each of the plurality of fasteners are configured to secure a vertical flange of a rail to a face of the left and right front pilasters. The left and right rear pilasters can be coupled to the interior surface of the cabinet and each of the left and right rear pilasters can comprise a side facing member and a front facing member. The side facing member can be coupled to the interior surface of the cabinet. The front facing member can comprise slots that each receive a tab of the vertical flange of the rail. One or more of the following features can be combined with the foregoing example embodiment.

In the foregoing example climate controlled food storage system, a first rail can be attached to the left front pilaster and the left rear pilaster, the first rail comprising a first vertical flange and a first horizontal flange, wherein the first vertical flange comprises a first aperture that receives a first fastener of the plurality of fasteners to secure the first rail to the face of the left front pilaster. The first vertical flange can further comprise a first tab extending from a rear of the first vertical flange and disposed in a first slot of the front facing member of the left rear pilaster. The first tab can rest in the first slot. The first slot can comprise an exterior edge and an interior edge, wherein the exterior edge is co-planar with the face of the left front pilaster. The first horizontal flange can comprise an end stop extending vertically from a rear of the first horizontal flange.

In the foregoing example climate controlled food storage system, when the first rail is attached to the left front pilaster and the left rear pilaster, a rear gap between an outer side surface of the end stop and a closest rear interior surface of the cabinet has a shortest distance of between ¼ inch and 2 inches to promote air circulation.

In the foregoing example climate controlled food storage system, when the first rail is attached to the left front pilaster and the left rear pilaster, a side gap between an outer side surface of the first vertical flange and a closest side interior surface of the cabinet has a shortest distance of between ¼ inch and 2 inches to promote air circulation.

In the foregoing example climate controlled food storage system, one or more cameras can be mounted on the interior surface of the cabinet, wherein the one or more cameras can be configured to capture images of food items stored in the cabinet and to transmit the images of the food items to an onboard computing system for inventory management.

In the foregoing example climate controlled food storage system, a top surface of the first horizontal flange and an inner side surface of the first vertical flange form an angle that is between 80 degrees and 89 degrees.

In the foregoing example climate controlled food storage system, the plurality of fasteners of the left and right front pilasters can have vertical spacing that is symmetrical from a top to a bottom of each of the left and right front pilasters.

In the foregoing example climate controlled food storage system, the slots of the left and right rear pilasters can have vertical spacing that is symmetrical from a top to a bottom of each of the left and right rear pilasters.

In the foregoing example climate controlled food storage system, the left and right front pilasters and the left and right rear pilasters can form a first vertical array and a second set of left and right front pilasters and a second set of left and right rear pilasters can form a second vertical array.

In the foregoing example climate controlled food storage system, a second rail can be attached to the right front pilaster and the right rear pilaster, the second rail comprising a second vertical flange and a second horizontal flange. The second vertical flange comprises a second aperture that receives a second fastener of the plurality of fasteners to secure the second rail to the face of the right front pilaster, and the second vertical flange comprises a second tab extending from a rear of the second vertical flange and disposed in a second slot of the front facing member of the right rear pilaster. The first rail and the second rail can form a horizontal plane and the first rail and the second rail can interchangeably support a pan and a bin.

In the foregoing example climate controlled food storage system, the first rail can be removed by removing the first fastener and sliding the first tab from the first slot, and the second rail can be removed by removing the second fastener and sliding the second tab from the second slot. The first rail and the second rail can be replaced by a shelf, the shelf comprising a horizontal base, a left vertical flange, and a right vertical flange. The left vertical flange can comprise a left aperture that receives the first fastener to secure the shelf to the face of the left pilaster and a left tab extending from a rear of the left vertical flange into the first slot of the front facing member of the left rear pilaster. The right vertical flange can comprise a right aperture that receives the second fastener to secure the shelf to the face of the right pilaster and a right tab extending from a rear of the right vertical flange into a second slot of the front facing member of the right rear pilaster.

In the foregoing example climate controlled food storage system, when the shelf is attached the left and right front pilasters and the left and right rear pilasters, a rear gap between a rear edge of the shelf and a closest rear interior surface of the cabinet has a shortest distance of between ¼ inch and 2 inches to promote air circulation; a left side gap between an outer side surface of the left vertical flange and a closest left side interior surface of the cabinet has a shortest distance of between ¼ inch and 2 inches to promote air circulation; and a right side gap between an outer side surface of the right vertical flange and a closest right side interior surface of the cabinet has a shortest distance of between ¼ inch and 2 inches to promote air circulation.

In the foregoing example climate controlled food storage system, a shelf can be mounted above or below the first rail and the second rail, the shelf comprising a horizontal base, a left vertical flange, and a right vertical flange. The left vertical flange can comprise a left aperture that receives a third fastener to secure the shelf to the face of the left pilaster and a left tab extending from a rear of the left vertical flange into a third slot of the front facing member of the left rear pilaster. The right vertical flange comprises a right aperture that receives a fourth fastener to secure the shelf to the face of the right pilaster and a right tab extending from a rear of the right vertical flange into a fourth slot of the front facing member of the right rear pilaster.

In the foregoing example climate controlled food storage system, a rear of the shelf can be lower than a front of the shelf, the rear of the first vertical flange can be lower than a front of the first vertical flange of the first rail; and the rear of the second vertical flange can be lower than a front of the second vertical flange of the second rail.

The foregoing embodiments are non-limiting examples and other aspects and embodiments will be described herein. The foregoing summary is provided to introduce various concepts in a simplified form that are further described below in the detailed description. This summary is not intended to identify required or essential features of the claimed subject matter nor is the summary intended to limit the scope of the claimed subject matter.

BRIEF DESCRIPTION OF THE DRAWINGS

The accompanying drawings illustrate only example embodiments of a food storage system onboard a vehicle and therefore are not to be considered limiting of the scope of this disclosure. The principles illustrated in the example embodiments of the drawings can be applied to alternate methods and apparatus for a food storage system onboard a vehicle. Additionally, the elements and features shown in the drawings are not necessarily to scale, emphasis instead being placed upon clearly illustrating the principles of the example embodiments. Certain dimensions or positions may be exaggerated to help visually convey such principles. In the drawings, the same reference numerals used in different embodiments designate like or corresponding, but not necessarily identical, elements.

DETAILED DESCRIPTION OF EXAMPLE EMBODIMENTS

The example embodiments discussed herein are directed to storage systems onboard a vehicle. The example embodiments described herein can provide an advantageous storage system onboard a vehicle in which food is prepared. The example storage systems described herein support an improved process for food preparation onboard a vehicle by optimizing the use of space within the vehicle while securely storing the food while the vehicle is in motion. Additionally, the example storage systems described herein are uniquely flexible so that they can be easily configured to meet the storage needs onboard the vehicle. These and other advantage will become more apparent with the following discussion of the example embodiments.

Prior art storage systems are inadequate for addressing the challenges of securely storing food onboard a vehicle. As one example, Avantco offers a variety of shelving systems for refrigerators, but the shelving systems are poorly suited for use onboard a vehicle in which food is prepared. For example, many of the Avantco shelving systems use brackets on which the shelves simply rest and, therefore, the shelves are not adequately secured as needed in a moving vehicle. Additionally, the Avantco shelves are not designed so that they can be secured, but at the same time allow for quick and easy reconfiguring of the shelves to meet the user's needs. The Avantco shelves also do not maximize the use of space, which is critical in a vehicle in which food is prepared. In contrast, the example storage systems described herein address one or more of these shortcomings.

As used herein, "cooking" includes any process that involves the application of heat to food items that are to be consumed, including but not limited to warming, reheating, rethermalizing, steaming, cooking, frying, air frying, toasting, boiling, broiling, baking, steaming, and sous vid techniques. Additionally, as used herein, "food" should be interpreted broadly to include any liquid, solid, or mixture that is consumed.

In the following paragraphs, particular embodiments will be described in further detail by way of example with reference to the drawings. In the description, well-known components, methods, and/or processing techniques are omitted or briefly described. Furthermore, reference to various feature(s) of the embodiments is not to suggest that all embodiments must include the referenced feature(s).

Figure 1:
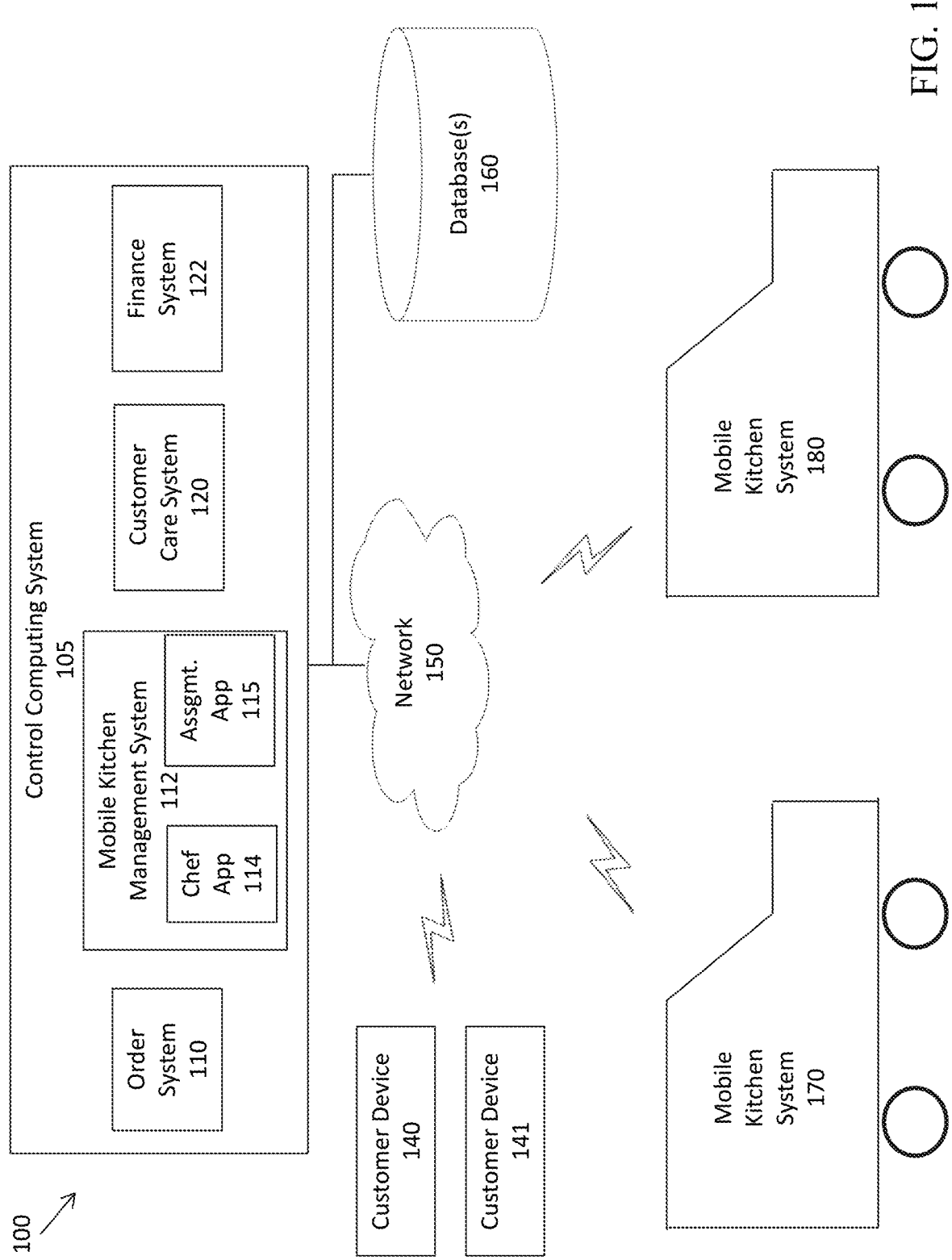
FIG. 1 is a block diagram illustrating a system used in food preparation and delivery in accordance with the example embodiments of the disclosure.
Figure 2:
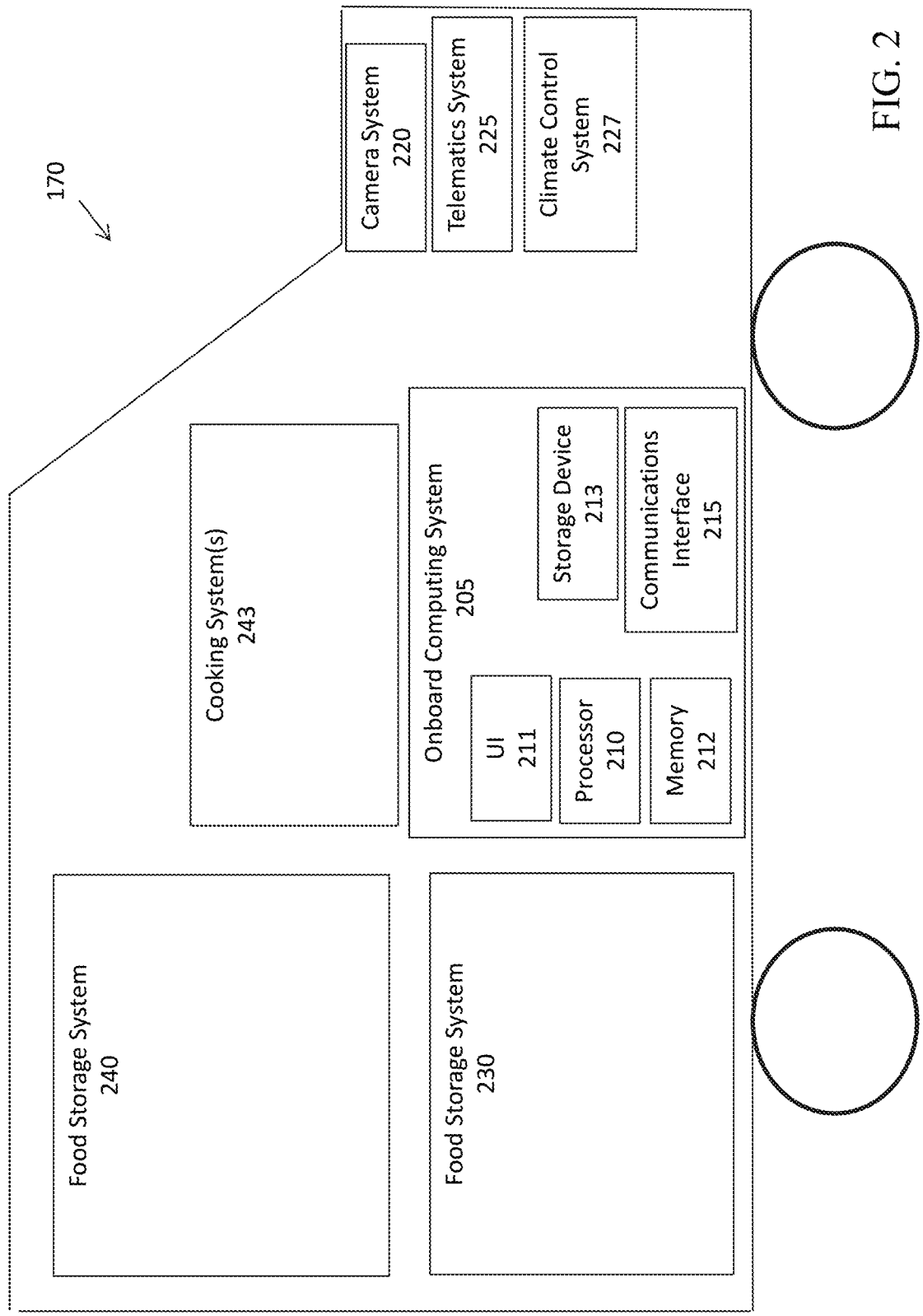
FIG. 2 is another block diagram illustrating a vehicle that is part of the system of FIG. 1 in accordance with the example embodiments of the disclosure.
Figure 7:
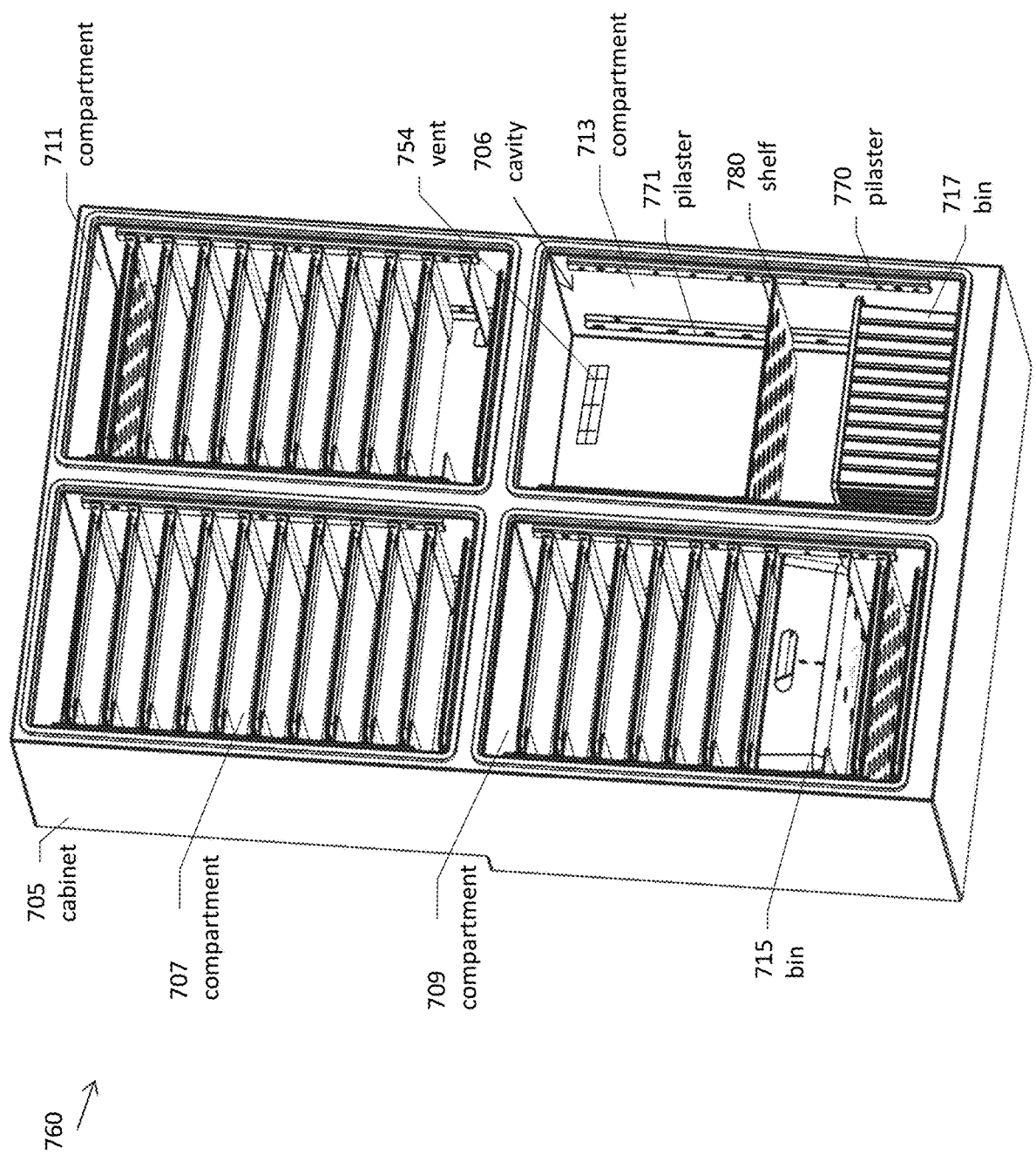
FIGS. 7, 8, and 9 illustrate aspects of yet another example of a food storage system in accordance with the example embodiments of the disclosure.
Figure 8:
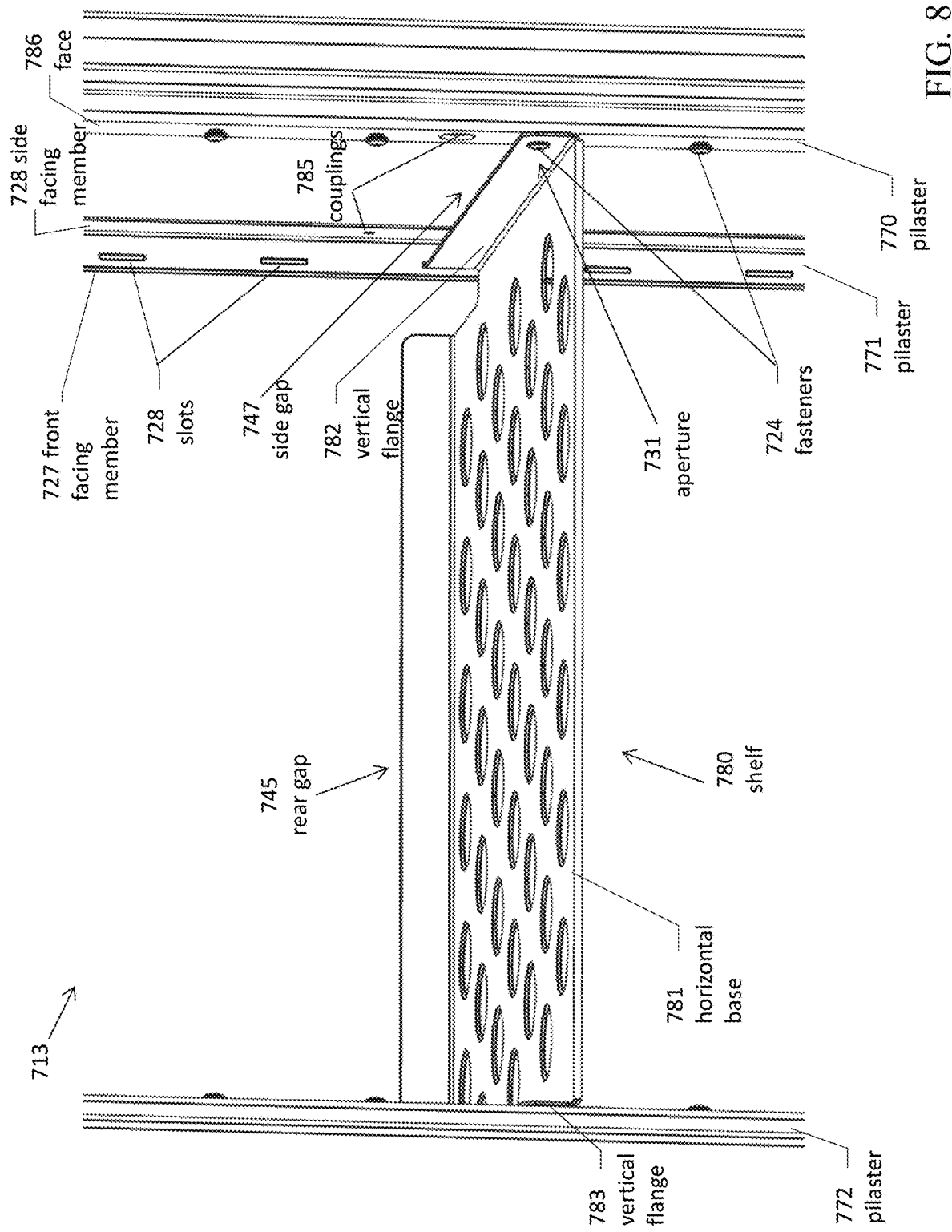
Figure 9:
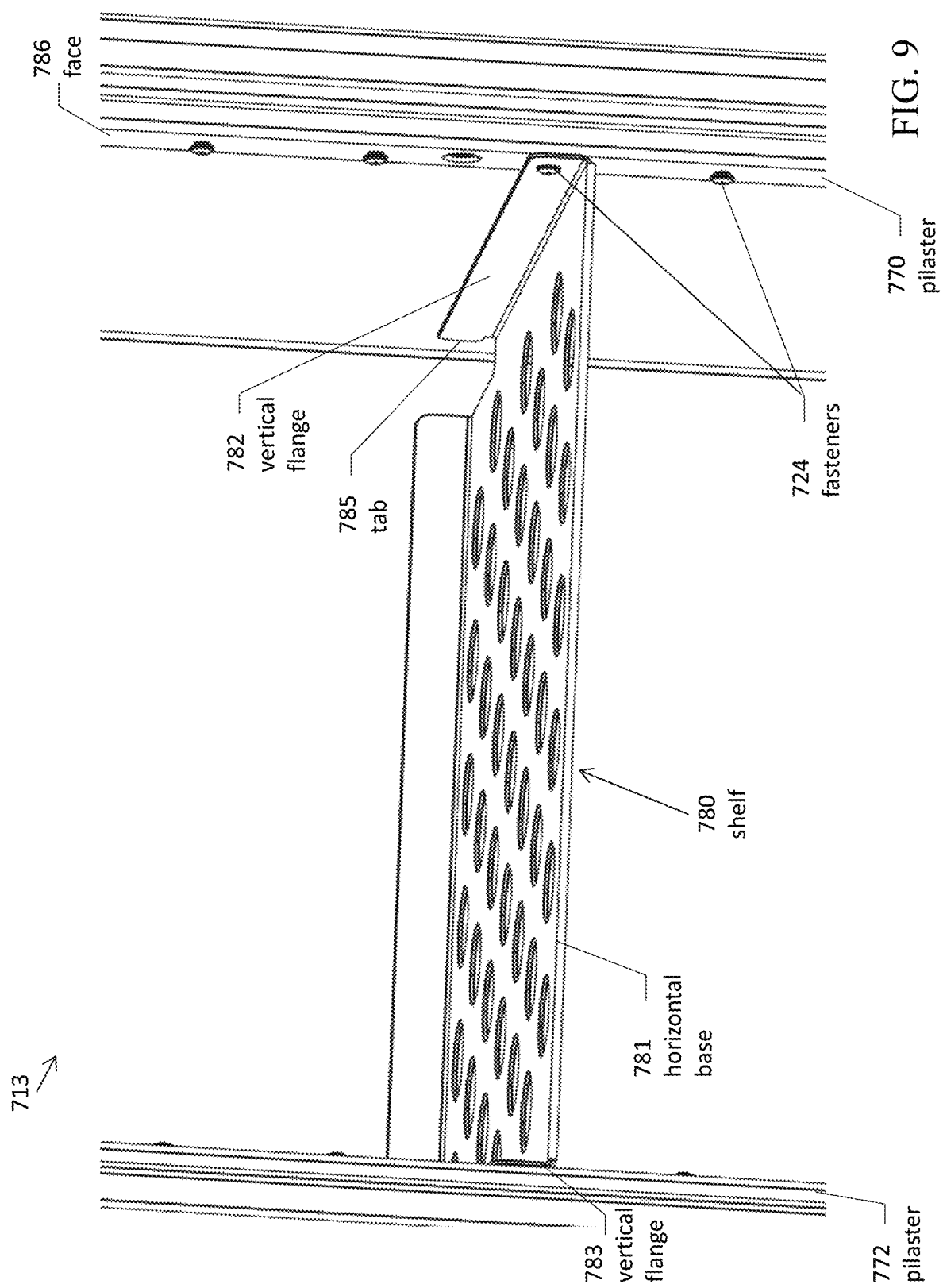

FIGS. 1 and 2 are block diagrams illustrating the architecture and subsystems of an example food preparation and delivery system. FIGS. 3, 4, 5, and 6 illustrate aspects of an example food storage system. Lastly, FIGS. 7, 8, and 9 illustrate examples of another food storage system.

Control Computing System and Mobile Kitchen Management System

Referring now to FIG. 1, a block diagram is provided illustrating the architecture of an example food preparation and delivery system 100. As will be described further, the system 100 includes mobile kitchen vehicles, also referred to as mobile kitchen systems, on which the disclosed climate controlled food storage systems can be installed. The system 100 comprises a control computing system 105 and mobile kitchen vehicles 170 and 180. While only two mobile kitchen vehicles 170 and 180 are illustrated in FIG. 1 for simplicity, it should be understood that the system is scalable and is designed to support many more mobile kitchen vehicles. The mobile kitchen vehicles communicate with the control computing system via a network 150 that can include one or more of a cellular mobile network, a wide area network, and the Internet. Additionally, customers can communicate orders for food items via network 150, or an alternate communications network, to the control computing system 105. The customers can communicate orders using a customer device 140 or 141, such as a mobile telephone, a smart phone, or a personal computer. While only two customer devices 140, 141 are illustrated in FIG. 1 for simplicity, it should be understood that the system is designed to support a large number of orders from a multitude of customer devices.

The example control computing system 105 comprises several subsystems illustrated in FIG. 1. The subsystems can be implemented as software, hardware, or a combination of software and hardware. Additionally, the subsystems can be implemented as software applications executing on the control computing system or they can be implemented as software applications or services implemented on separate or remote computing systems in a distributed manner. While the subsystems illustrated in FIG. 1 are shown as discrete subsystems of the control computing system 105, it should also be understood that in some examples the subsystems can be combined with each other or with other subsystems not illustrated in the example of FIG. 1.

The subsystems of control computing system 105 include an order system 110 that receives orders for food items from customer devices. The order system 110 hands off customer orders to the mobile kitchen management system 112, which manages the assignment of orders to and communications with mobile kitchen vehicles 170, 180. As one example, the mobile kitchen management system 112 can include a chef application 114 and an assignment application 115. The assignment application 115 can retrieve data regarding the available mobile kitchen vehicles, their locations, their currently assigned customer orders, and their current inventory. The assignment application 115 can use the retrieved data to make assignments of new customer orders to mobile kitchen vehicles. For example, the assignment application 115 can identify mobile kitchen vehicles that are within a certain distance of a customer and that have the food items identified in the customer's order in onboard inventory. The assignment application 115 can select from among the identified mobile kitchen vehicles a mobile kitchen vehicle best suited to fulfill the customer order. Criteria for selecting a mobile kitchen vehicle can include proximity to the customer and the number of customer orders already assigned to the mobile kitchen vehicle. The assignment application 115 also can use the inventory data to determine when mobile kitchen vehicles need to be replenished with new food and supplies.

The chef application 114 can analyze the customer orders assigned to a particular mobile kitchen vehicle, determine a preparation schedule for the food items in the customer orders, and present preparation instructions to a chef onboard the mobile kitchen vehicle. In addition to the assignment application 115 and the chef application 114, the mobile kitchen management system 112 can include other applications such as an image processing system that receives images from the mobile kitchen vehicles. For example, one or more cameras onboard the mobile kitchen vehicles can capture images associated with the food prepared onboard the mobile kitchen vehicle and those images can be transmitted via network 150 to the image processing system for use in supervising the preparation of the food items.

Additional example subsystems of control computing system 105 include a customer care system 120 and a finance system 122. The customer care system 120 can communicate with customer devices regarding reviews of food preparation and food delivery services and can address quality or service concerns. The finance system 122 can process transactions with customer devices.

Mobile Kitchen Vehicle

FIG. 2 illustrates a more detailed view of example mobile kitchen vehicle 170. The mobile kitchen vehicle 170 comprises a vehicle with subsystems including food storage systems 230 and 240, cooking systems 243, a climate control system 227, and an onboard computing system 205. The onboard computing system 205 can include a processor 210, memory 212, a communications interface 215, a user interface 211, and storage device 213. The storage device 213 can store software applications that support one or more persons, such as a chef, working onboard the mobile kitchen system 170. For example, the software applications can include a driver application that assists a worker in driving the mobile kitchen vehicle 170 to customer locations, commissaries, or supply replenishment centers. The software applications also can include a chef application that receives customer orders for food items, analyzes the customer orders, and provides a chef onboard the mobile kitchen vehicle 170 with instructions for preparing food items. The onboard computing system 205 can receive customer orders for food items from the mobile kitchen management system 112 via a communications network. The customer orders for food items can be for one or more customers and each order can include instructions for preparing the food items. The onboard computing system 205 can display the instructions for preparing the food items to the chef onboard the vehicle.

The cooking systems 243 can be used to prepare food items. As examples, the cooking systems 243 can include appliances, such as an oven, a fryer, and a rethermalizer. As will be described further below, the cooking systems 243 can include devices that communicate with the onboard computing system 205. For example, sensors can detect a status of an appliance and provide measured data to the onboard computing system 205. Additionally, the cooking systems can receive commands from the onboard computing system 205.

Referring to the other systems onboard the mobile kitchen vehicle, as illustrated in the example of FIG. 2, the food storage systems 230 and 240 can contain the ingredients and previously prepared food items that are used in fulfilling the customer orders. The food storage systems 230 and 240 can include a variety of subsystems, including refrigerators, freezers, warming cabinets, ovens, hot/hold cabinets, and storage pantries. In some examples described herein, the food storage systems are described as climate controlled. However, it should be understood that the food storage systems are not required to be climate controlled and can be implemented as food carts or other storage systems. Additionally, it should be understood that the food storage systems The food storage systems 230 and 240 can include sensors that collect data and that communicate with the onboard computing system 205. The collected data can include data indicating the temperature or humidity within the food storage systems 230 and 240. The sensors can include optical sensors or weight transducers that gather data associated with the contents within the food storage systems 230 and 240, such as whether shelves or pans within the food storage systems 230 and 240 contain food or are empty. The food storage systems 230 and 240 can include embedded heating and cooling systems that control the temperature within the food storage systems 230 and 240. Alternatively, the food storage systems can receive warm and cold air from the vehicle's climate control system 227.

The climate control system 227 can be used to control the air within the vehicle, including the air temperature and humidity. The climate control system 227 can include one or more internal sensors that measure temperature and humidity within the vehicle as well as one or more external sensors that measure temperature and humidity outside of the vehicle. The climate control system can also include a refrigeration system that cools and dries air for the interior of the vehicle as well as a fan and vents that direct warmed or cooled air into the interior of the vehicle. The climate control system can receive a set point temperature from a user and can operate to maintain the air within the vehicle at the set point temperature. In some example embodiments, the climate control system 227 can communicate with the onboard computing system 205 or with other controllers onboard the vehicle.

Other systems onboard the mobile kitchen vehicle 170 can include a telematics system 225 and a camera system 220. The telematics system 225 can be used for communications between the onboard computing system 205 and the control computing system 105. The communications can include customer orders, status information regarding the preparation of customer orders onboard the mobile kitchen vehicle, and data associated with the various systems onboard the mobile kitchen vehicle 170 including the cooking systems, the food storage systems, the camera systems, and the engine control system of the mobile kitchen system 170. The camera system 220 can comprise one or more cameras located within the vehicle that can be used to track the progress and the quality of the food preparation. The cameras can supply images of a food item to the onboard computing system 205 and the images can be associated with the food item that is currently being prepared. When the preparation of a food item is completed, the chef can provide an input to the onboard computing system 205 indicating that the food item is completed. The camera system 220 can capture one or more images of the completed food item in its packaging. The images of the food item can be stored for quality control, customer service, marketing, inventory management, and other purposes. The camera system 220 also can include cameras within the food storage systems to identify the presence or quantity of food items.

The functions of the onboard computing system 205 can be implemented with software and hardware. The onboard computing system 205 can comprise one or more hardware processors, non-transitory computer-readable memory (which can include volatile and persistent memory), and a communication interface. The non-transitory computer-readable memory can store software, algorithms, instructions and data that can be executed by the one or more processors. For example, instructions for processing an image of a food item to identify a tracking code can be stored in memory for execution by the processor. The instructions executed by the processor also can include commands sent via the communication interface from the control computing system 105 to the onboard computing system 205 relating to the preparation of food items or the collection of data associated with the preparation of food items.

The processor(s) of the onboard computing system 205 can be implemented in a variety forms that are generally known, including but not limited to a central processing unit, a multi-core processor, a system on a chip, a field programmable gate array, and an application-specific integrated circuit. The memory can include both volatile and persistent memory and can store computer-readable instructions for execution by the processor(s) as well as data such as images of food items and customer reviews. In certain example embodiments, in addition to or as an alternative to local memory, computer-readable instructions and data can be stored remotely in database 160 or on a cloud-based server. The communications interface of the control computing system 105 and the onboard computing system 205 can support long range wireless communication, for example via a cellular network.

Example Food Storage Systems

Figure 3:
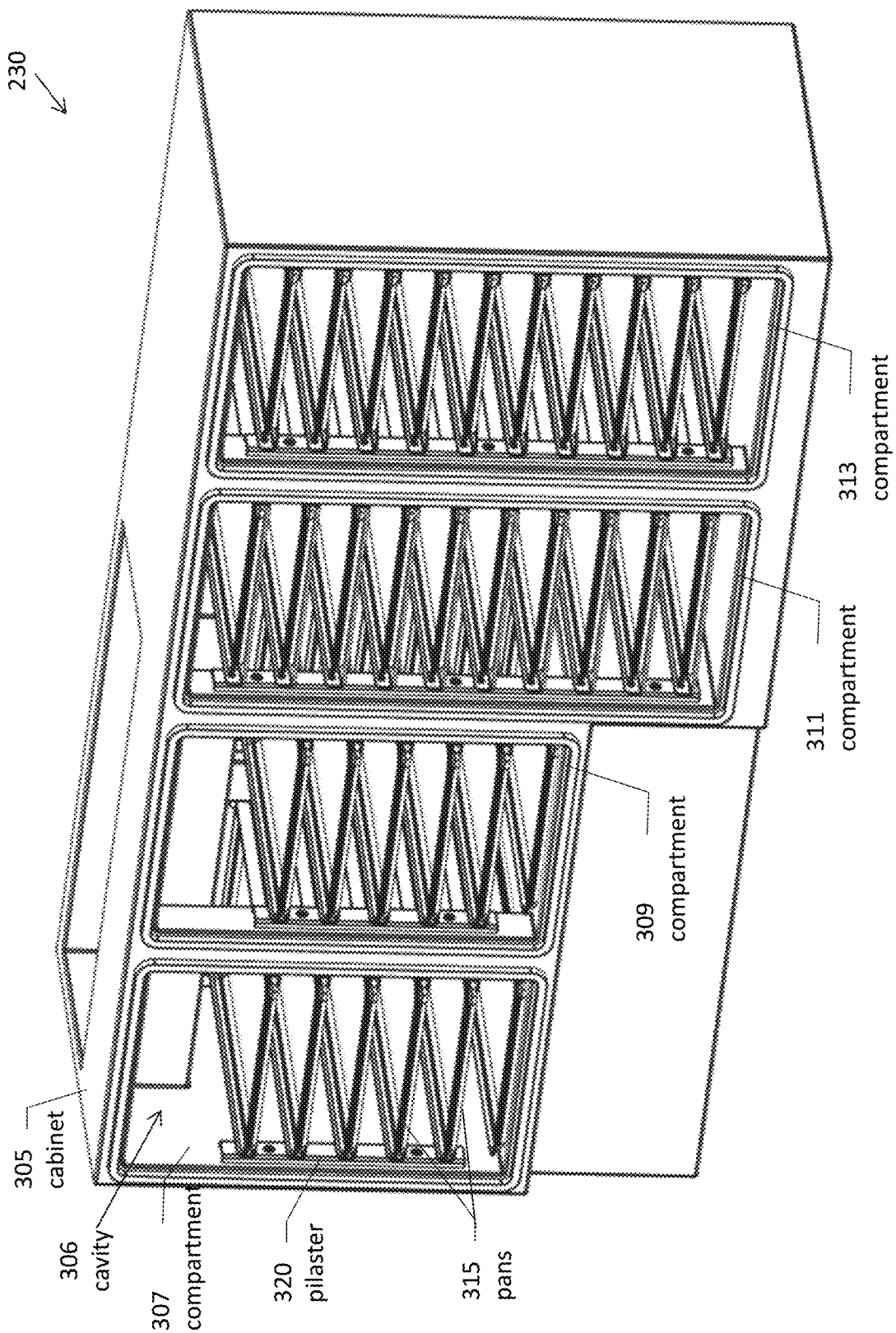
FIGS. 3, 4, and 5 illustrate aspects of a food storage system in accordance with the example embodiments of the disclosure.
Figure 4:
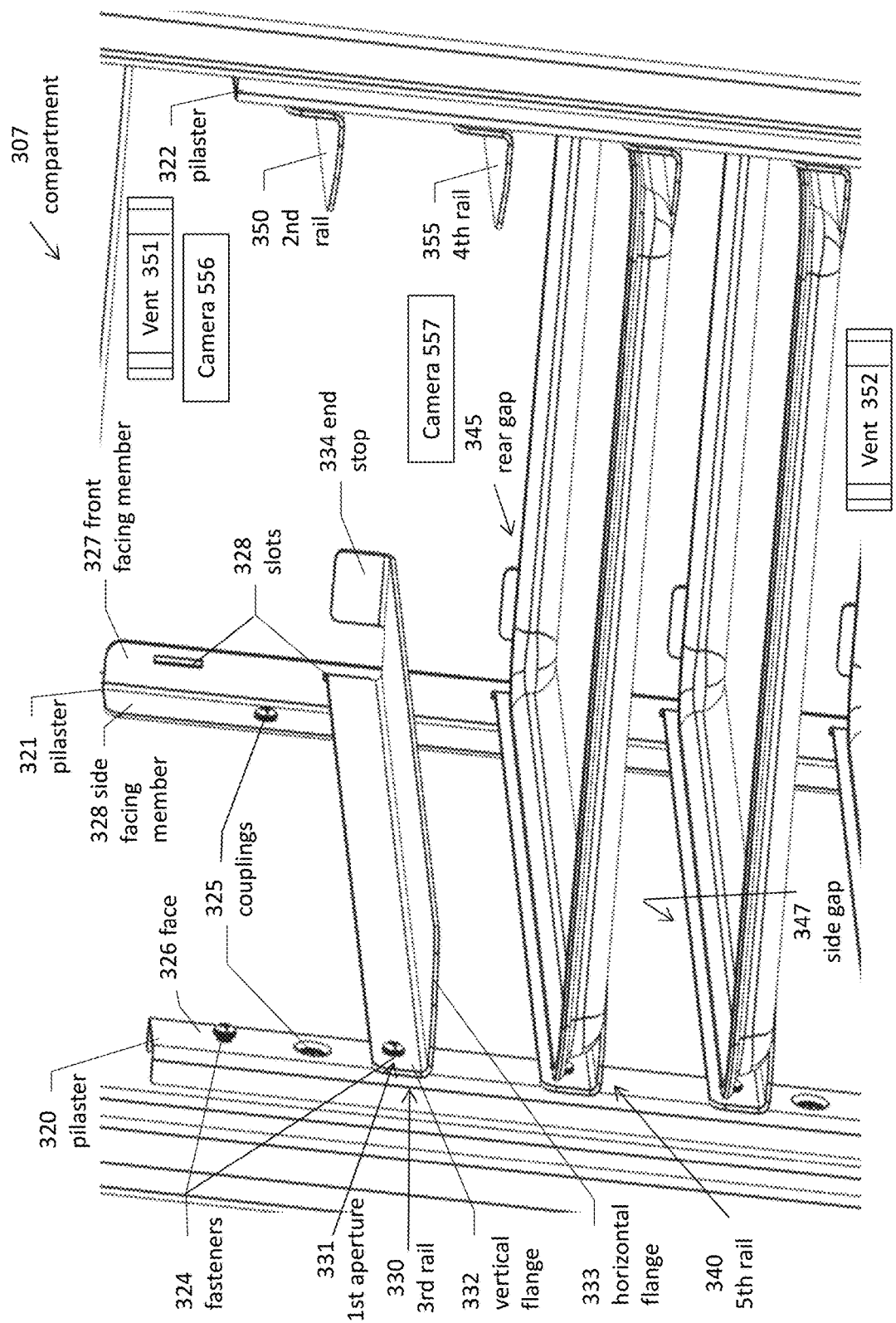
Figure 5:
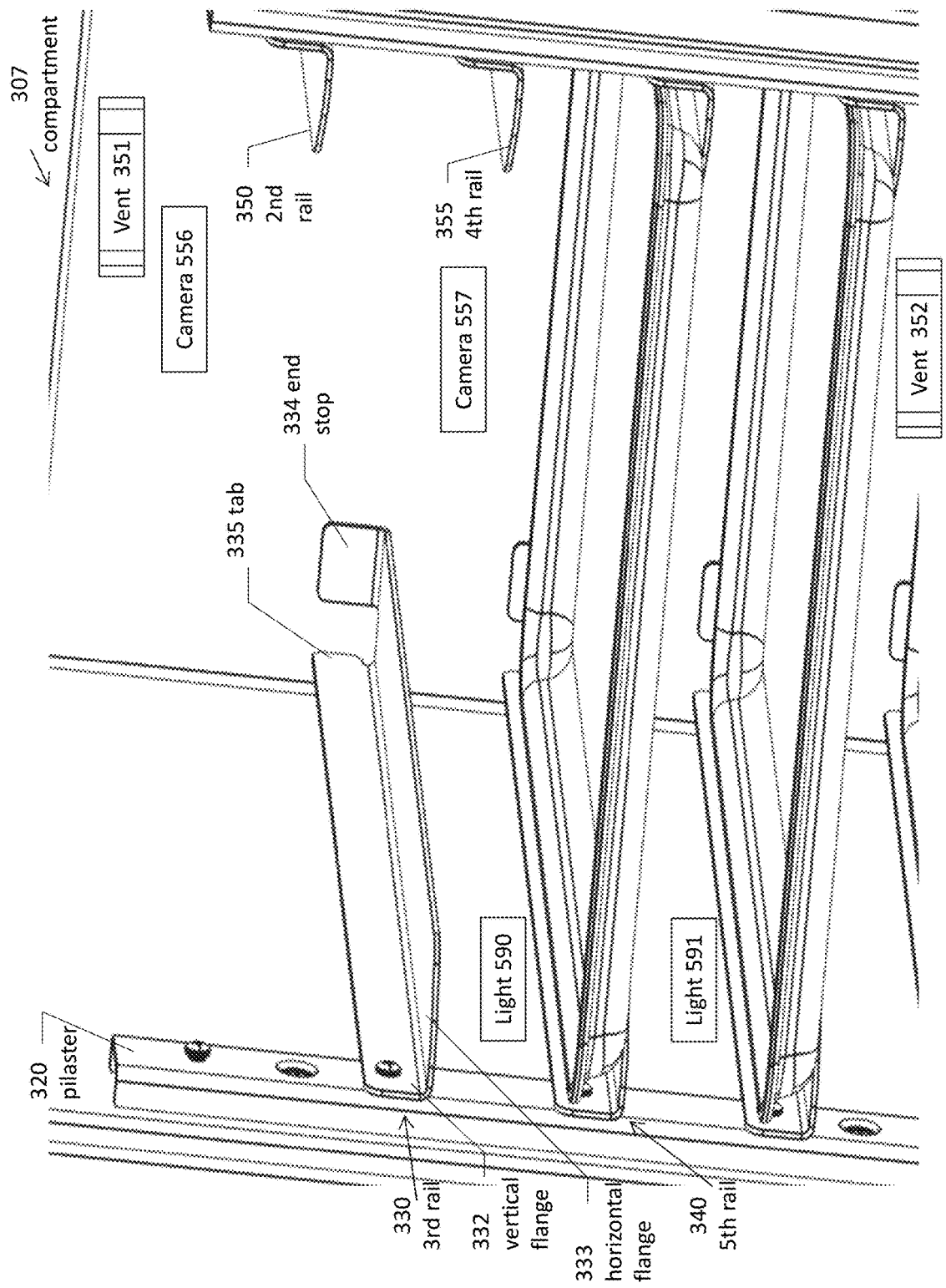

Referring now to FIGS. 3, 4, and 5, an example food storage system 230 is illustrated in accordance with the example embodiments of this disclosure. The food storage system 230 comprises a cabinet 305 that can be mounted within a mobile kitchen vehicle. The cabinet 305 is configured to maximize the use of storage space within the cabinet. The example cabinet 305 comprises a set of walls that have interior surfaces that define a cavity 306. In alternate embodiments, the cabinet can have other shapes and sizes.

The example cabinet 305 includes four compartments, 307, 309, 311, and 313, each of which contains a vertical array of rails and/or shelves for storing food items. Each compartment has a left and right front pilaster and a left and right rear pilaster. The pilasters are mounted to an interior surface of the cabinet 305. The interior surface to which the pilasters are mounted can be a single continuous interior surface or multiple discrete interior surfaces. In the example cabinet 305 illustrated in FIG. 3, the front left pilaster 320 is visible in compartment 307 and is shown coupled to an interior side wall of the cabinet. Similarly, the front left pilasters of the other compartments are also visible. As will be described in further detail in connection with FIGS. 4 and 5, the pilasters of compartment 307 support rails that are attached on the left and right sides of the compartment 307. The rails support pans 315 that can contain various food items. Each pan shown in FIG. 3 has an upward turned rim along its perimeter that prevents the food items from sliding off the pan when the vehicle is in motion.

In the illustration of FIG. 3, the doors have been removed from each of the four compartments of the example cabinet 305 so that the interior of each compartment is visible. In the example cabinet 305, air can flow freely between the four compartments. However, in other embodiments, interior walls can divide the compartments and each compartment can have dedicated ventilation allowing one compartment to be a warming compartment while another compartment can be for refrigeration.

Referring now to FIGS. 4 and 5, more detailed views of compartment 307 are illustrated. It should be understood that the components of compartments 309, 311, and 313 are similar to the components of compartment 307 and, therefore, a detailed description of those components in compartments 309, 311, and 313 will not be repeated.

Compartment 307 comprises a left front pilaster 320, a right front pilaster 322, a left rear pilaster 321, and a right rear pilaster. While the right rear pilaster is not visible in FIGS. 4 and 5, it should be understood to have generally the same configuration as left rear pilaster 321, but is a mirror image of left rear pilaster 321. The left front pilaster 320 comprises couplings 325, such as screws, pins, or rivets, that secure the left front pilaster 320 to the interior surface of the cabinet 305. The left front pilaster 320 also comprises fasteners 324, such as screws, that are used to secure rails or shelves to the pilaster. The fasteners 324 lock the rails or shelves into place ensuring that they do not shift when the mobile kitchen vehicle is in motion. The fasteners 324 can be unfastened and refastened with a tool, such as a screwdriver, so that rails and shelves can be easily installed, removed, or exchanged.

The couplings 325 and the fasteners 324 are spaced symmetrically along the vertical length of the left front pilaster 320 as well as the right front pilaster 322. For example, the two couplings 325 visible along the left front pilaster 320 in FIGS. 3 and 4 are spaced equal distances from the top and bottom ends of the left front pilaster 320. Similarly, the five fasteners 324 supporting the five rails visible along the left front pilaster 320 in FIGS. 3 and 4 are spaced symmetrically from the top and bottom ends of the left front pilaster 320. Accordingly, the left front pilaster 320 can be inverted and used as the right front pilaster on the right side of the compartment 307. This symmetry in the front pilasters simplifies manufacturing of the pilasters and facilitates installation as the same type of front pilasters can be used on both the left and the right sides of the compartment 307.

The left and right front pilasters have a U shape with a channel running along the vertical interior portion of the front pilasters. In other words, a horizontal cross section of the front pilasters has a U shape. The front pilasters comprise front and rear members extending along the vertical length of the pilasters and a face member that joins the front and rear members. When the front pilasters are coupled to the interior surface of the cabinet, the front and rear members extend away from the interior surface of the cabinet with the channel enclosed by the face member. The face member has a face 326 that receives the couplings 325 and fasteners 324. The U shape of the front pilasters positions the face 326 a certain distance away from the interior surface of the cabinet creating a side gap 347 when a rail or shelf is attached to the front pilasters. The side gap 347 is a space between the interior surface of the cabinet and the outer surface of the vertical flange of the rail or shelf. At the shortest distance between the interior surface of the cabinet and the outer surface of the vertical flange, the side gap 347 is between ¼ inch and 2 inches, and preferably the side gap 347 is approximately ½ inch. As such, the side gap 347 provides a passage for air to flow within the cabinet to promote temperature uniformity within the cabinet while also maximizing the available space for a shelf or pan to store food items. A similar side gap exists between rails on the right side of the compartment, such as second rail 350, and the closest interior surface of the cabinet to which the right front pilaster 322 is coupled.

Turning to the rear pilasters, as referenced previously, a left rear pilaster 321 and a similar right rear pilaster are positioned within the compartment 307 to support the rails and/or shelves within the compartment. The rear pilasters comprise a side facing member and a front facing member that form a L shape. In other words, a horizontal cross section of the rear pilasters has an L shape. Similar to the front pilasters, the rear pilasters have couplings 325 along the vertical length of the side facing members 328 to couple the rear pilasters to the interior surface of the cabinet. The front facing members of the rear pilasters have slots 328 along the vertical length of the front facing members. Similar to the couplings and fasteners of the front pilasters, the couplings 325 and slots 328 of the rear pilasters are spaced symmetrically from the top and bottom ends of the left and right rear pilaster. Specifically, the top and bottom couplings on the side facing member 328 of the rear pilaster are each at the same distance from the respective top and bottom of the rear pilaster. Likewise, there are 5 slots spaced equidistantly along the vertical length of the front facing member 327 of the rear pilaster. Accordingly, the left rear pilaster 321 can be inverted and used as the right rear pilaster on the right side of the compartment 307. This symmetry in the rear pilasters simplifies manufacturing of the pilasters and facilitates installation as the same type of rear pilasters can be used on both the left and the right sides of the compartment 307 by simply inverting the rear pilaster.

As can be seen in FIGS. 4 and 5, a series of rails can be attached to the front and rear left side pilasters and a corresponding series of rails can be attached to the front and rear right side pilasters. In FIGS. 4 and 5, the first rail in the top left position has been removed to illustrate the details of the left front and rear pilasters. The third rail 330 and fifth rail 340 are shown attached to the left front pilaster 320 and the left rear pilaster 321. Similarly, the second rail 350 and fourth rail 355 are shown attached on the right side to the right front pilaster 322 and the right rear pilaster. Each of the rails comprises a vertical flange and a horizontal flange joined to form an L shape. For example, third rail 330 comprises a vertical flange 332 and a horizontal flange 333. The vertical flange 332 includes an aperture 331 adjacent a front end of the vertical flange. The aperture 331 receives fastener 324 for securing the third rail 330 to the left front pilaster 320.

The horizontal flange 333 can have a front edge that is chamfered as shown in FIGS. 4 and 5. Alternatively, the front edge of the horizontal flange 333 can be squared off to provide additional support when loading and removing pans from the rails. The horizontal flange 333 includes an end stop 334 that prevents a pan resting on the rail from sliding too far back into the cabinet. The end stop 334 prevents excessive movement of a pan resting on the rail which might damage the food items on the pan. Additionally, the end stop 334 can prevent the pan from tipping off the rear end of the rail. As illustrated in FIGS. 3 and 4, the end stop 334 is a vertical member extending upward from the rear end of the horizontal flange 333. However, in alternate embodiments, the end stop can take other shapes. The end stop 334 has an inner surface that faces toward a pan loaded onto the rail and an outer surface that faces toward the rear interior surface of the cabinet. A rear gap 345 is the space between the outer surface of the end stop 334 and the rear interior surface of the cabinet. At the shortest distance between the rear interior surface of the cabinet and the outer surface of the end stop 334, the rear gap 345 is between ¼ inch and 2 inches, and preferably the rear gap 345 is approximately ¾ of an inch. As such, the rear gap 345 provides a passage for air to flow within the cabinet to promote temperature uniformity within the cabinet while also maximizing the available space for a shelf or pan to store food items.

By holding the pans in place while the mobile kitchen vehicle travels to various customers, the end stop 334 assists with tracking the inventory of food items stored on pans within the cabinet. As shown in FIGS. 4 and 5, the cabinet can include cameras mounted on the interior surface of the cabinet that are used for tracking inventory. In the example of compartment 307, two cameras 356 and 357 are illustrated, but it should be understood that a greater or fewer number of cameras can be used to track food inventory. The cameras can capture images of food stored on pans that are mounted on the rails and can provide the images to the onboard computing system 205. The onboard computing system 205 can execute image processing software that analyzes the images from the camera and determines the number of food items remaining on the pans within the cabinet. The onboard computing system 205 can transmit food inventory information gathered from the cameras, via the telematics system 225, to the control computing system 105 for tracking inventory and planning replenishment of the mobile kitchen vehicle. If the pans were permitted to shift during the motion of the mobile kitchen vehicle, it would make the analysis of the camera images and the tracking of inventory more difficult. Accordingly, by minimizing the movement of the pans mounted on the rails, the end stops facilitate food inventory tracking. Another optional feature that can be used in conjunction with or as an alternative to the cameras is to include one or more weight transducers on the rails. The weight transducers can gather weight measurements indicating the quantity of food stored within the cabinet and the weight measurements can be gathered by the onboard computing system 205 for food inventory tracking.

FIG. 5 provides a view of the compartment 307 similar to that of FIG. 4, but with the left rear pilaster 321 removed. With the left rear pilaster 321 removed, the tab 335 extending from the rear end of the vertical flange 332 of first rail 330 is visible. The tab 335 fits into the slot 328 to secure the rail to the left rear pilaster 321. As shown in FIG. 4, the slot has an elongated shape with an exterior edge closest to the side facing member 328 and an interior edge closest to the end stop 334. The tab 335 slides into the slot between the exterior edge and the interior edge. The exterior edge of the slot 328 can be co-planar with the face 326 of the left front pilaster 320 so that the planar shape of the vertical flange 332 fits against the face 326 (at the front end of the vertical flange 332) and into the slot 328 (at the rear end of the vertical flange 332).

The tab 335 can rest in the slot 328 and easily slide in and out of the slot, without requiring a tool such as a screwdriver. A fastener at the rear end of the rail towards the back of the cabinet would be difficult to manipulate with a tool and would slow down the process of installing and removing a rail or shelf. Therefore, using the tab and slot to position the rail or shelf at the rear of the cabinet eliminates the need for a fastener at the rear end of the rail and facilitates rapid installation and removal of the rail. The aperture 331 and fastener 324 in combination with the tab 335 and slot 328 is sufficient to secure the third rail 330 while the mobile kitchen vehicle is in motion while also facilitating rapid installation and removal of the rail. In an alternative embodiment, the tab 335 can have a notch on the bottom edge of the tab that further serves to lock the tab in place within the slot.

FIG. 5 also illustrates an optional pick to light system. A pick to light system can be used to direct a person to a particular shelf for retrieving a food item. As shown in FIG. 5, the optional pick to light system can include a light adjacent to each rail and the individual lights can be illuminated at designated times to direct the person to a particular shelf. Lights 590 and 591 are shown as examples in FIG. 5. The illumination of the individual lights can be controlled by a controller, such as the onboard computing system, that is managing inventory.

It should be understood that the other rails on the left and right sides have features similar to those described with respect to the third rail 330. As illustrated in the example of FIGS. 3, 4, and 5, pans can be placed on the rails for storing food items that are to be refrigerated or warmed inside the cabinet. Any of the rails illustrated in FIGS. 3, 4, and 5 can be easily removed and replaced with shelves. Alternatively, certain rails can be removed without a shelf being added to provide more vertical space for certain food items, such as tall drink containers.

In the example of FIGS. 3, 4, and 5, the rails on the left and right sides of the cabinet are level with the horizontal and, therefore, the pans loaded on the rails also are level with the horizontal. However, in alternate embodiments, it can be beneficial for the rails to attach to the pilasters at a tilt so that the rear ends of the rails are lower than the front ends of the rails. Tilting the rear ends of the rails downward can assist in securing the pans within the cabinet and inhibit the pans from sliding towards the front of the cabinet where the doors are located. The tilt can be accomplished by adjusting the height of the tab 335 at the rear end of the vertical flange 332 so that the rail 330 rests lower in the slot 328. Alternatively, the tilt can be accomplished by moving aperture 331 adjacent the front end of the rail to a lower position so that the front end of the rail is higher than the rear end of the rail. Such a tilt in the rails and pans can be beneficial when the mobile kitchen vehicle is in motion and the contents of the cabinets are subjected to significant acceleration.

Figure 6:
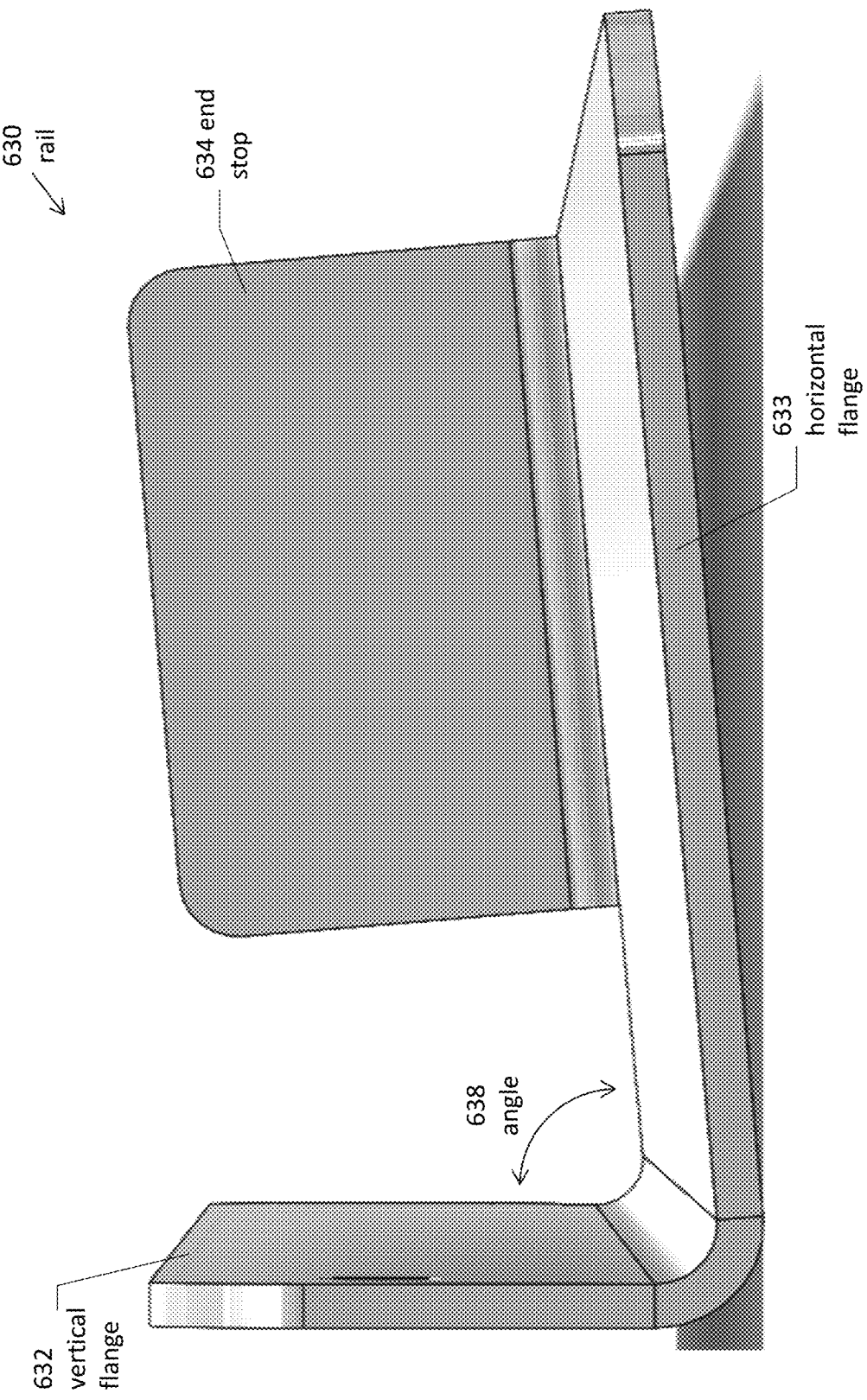
FIG. 6 illustrates aspects of an example rail that can be used in a food storage system in accordance with the example embodiments of the disclosure.

FIG. 6 illustrates another alternate embodiment for a rail. Similar to rail 330 of FIGS. 3, 4, and 5, rail 630 of FIG. 6 includes a vertical flange 632 with an aperture 631 and a horizontal flange 633 with an end stop 634. However, in contrast to the rail 330, in the rail 630, the angle 638 between the vertical flange 632 and the horizontal flange 633 has been modified. That is, in rail 330, the angle between the vertical flange 332 and the horizontal flange 333 is 90 degrees. In contrast, the angle 638 between the flanges of rail 630 is less than 90 degrees to facilitate sliding of pans on and off of the rails. The angle 638 can be between 80 degrees and 89 degrees. Reducing the angle 638 of rail 630 reduces the amount of surface area of the horizontal flange 633 that is in contact with the bottom surface of a pan that is placed on the rail 630. Reducing the surface area of contact between the rail and the pan reduces friction and facilitates sliding the pans on and off the rails. This can be particularly beneficial for pans of relatively softer metals such as aluminum.

Referring now to FIGS. 7, 8, and 9, aspects of another food storage system in the form of cabinet 705 are illustrated. Cabinet 705 also can be installed in a mobile kitchen vehicle for storing food items. Cabinet 705 can be included in a mobile kitchen vehicle in addition to cabinet 305 or as an alternative to cabinet 305. Given the limited space available in a mobile kitchen vehicle, the cabinet 705 is configured to maximize the use of storage space within the cabinet. The example cabinet 705 comprises a set of walls that have interior surfaces that define a cavity 706. In alternate embodiments, the cabinet can have other shapes and sizes.

The cavity 706 of example cabinet 705 has been subdivided with interior walls into four compartments, 707, 709, 711, and 713, each of which contains a vertical array of rails and/or shelves for storing food items. Each compartment has a left and right front pilaster and a left and right rear pilaster. The pilasters are mounted to an interior surface of the cabinet 705. The interior surface to which the pilasters are mounted can be a single continuous interior surface or multiple discrete interior surfaces. In the example cabinet 705 illustrated in FIG. 7, the front right pilaster 770 is visible in compartment 713 and is shown coupled to an interior side wall of the cabinet. Similarly, the front right pilasters of the other compartments are also visible. The pilasters can support shelves, such as shelf 780, as well as rails that support bins, such as bin 715. In some cases, as illustrated by bin 717, bins can be placed at the bottom of a compartment.

In the illustration of FIG. 7, the doors have been removed from each of the four compartments of the example cabinet 705 so that the interior of each compartment is visible. In contrast to the cabinet 305 of FIG. 3, the interior walls of cabinet 705 do not permit air flow between the compartments. Because each compartment has its own ventilation system, as exemplified by vent 754, one compartment can be used for refrigerating foods while another compartment can be used for warming foods.

Referring now to FIGS. 8 and 9, more detailed views of compartment 713 are illustrated. While compartments 707, 709, and 711 are primarily filled with rails and pans instead of shelves, it should be understood that the components of these compartments are similar to the components of compartment 713 and, therefore, a detailed description of those components in compartments 707, 709, and 711 will not be repeated.

Compartment 713 comprises a right front pilaster 770, a left front pilaster 772, a right rear pilaster 771, and a left rear pilaster. While the left rear pilaster is not visible in FIGS. 8 and 9, it should be understood to have generally the same configuration as right rear pilaster 771, but is a mirror image of right rear pilaster 321. The right front pilaster 770 comprises couplings 785, such as screws, pins, or rivets, that secure the right front pilaster 770 to the interior surface of the cabinet 705. The right front pilaster 770 also comprises fasteners 724, such as screws, that are used to secure rails or shelves to the pilaster. The fasteners 724 lock the rails or shelves into place ensuring that they do not shift when the mobile kitchen vehicle is in motion. The fasteners 724 can be unfastened and refastened with a tool, such as a screwdriver, so that rails and shelves can be easily installed, removed, or exchanged.

As with the pilasters of FIGS. 3-5, the couplings 785 and the fasteners 724 are spaced symmetrically along the vertical length of the right front pilaster 770 as well as the left front pilaster 772. Accordingly, the right front pilaster 770 can be inverted and used as the left front pilaster on the left side of the compartment 713. This symmetry in the front pilasters simplifies manufacturing of the pilasters and facilitates installation as the same type of front pilasters can be used on both the left and the right sides of the compartment 713.

Similar to the pilasters described in FIGS. 3-5, the left and right front pilasters 770, 772 have a U shape with a channel running along the vertical interior portion of the front pilasters. In other words, a horizontal cross section of the front pilasters has a U shape. The front pilasters comprise front and rear members extending along the vertical length of the pilasters and a face member that joins the front and rear members. The face member has a face 786 that receives the couplings 785 and fasteners 724. The U shape of the front pilasters positions the face 786 a certain distance away from the interior surface of the cabinet creating a side gap 747 when a rail or shelf is attached to the front pilasters. The side gap 747 is a space between the interior surface of the cabinet and the outer surface of the vertical flange of the rail or shelf on each side of the compartment 713. The previous description of the side gap 347 of FIGS. 3-5 also applies to the similar side gap 747 of FIGS. 8 and 9.

Turning to the rear pilasters, as referenced previously, a right rear pilaster 771 and a similar left rear pilaster are positioned within the compartment 713 to support the rails and/or shelves within the compartment. Similar to the rear pilasters of FIGS. 3-5, the rear pilasters of FIGS. 7-9 comprise a side facing member and a front facing member that form a L shape and have couplings 785 along the vertical length of the side facing members 728 to couple the rear pilasters to the interior surface of the cabinet. The front facing members 727 of the rear pilasters have slots 728 along the vertical length of the front facing members. Similar to the couplings and fasteners of the front pilasters, the couplings 785 and slots 728 of the rear pilasters are spaced symmetrically from the top and bottom ends of the left and right rear pilaster to simplify manufacturing and facilitate use of the rear pilasters on either the left or right side.

As can be seen in FIGS. 8 and 9, a series of shelves such as shelf 780 can be coupled to the pilasters. The pilasters facilitate flexibility in that additional shelves or rails can be attached above or below shelf 780. Shelf 780 comprises a horizontal base 781 and a vertical flange 782. The horizontal base 781 can have apertures as shown in FIGS. 8 and 9 to reduce the weight of the shelf and to promote air flow throughout the compartment 713. The shelf can also have a rear flange extending vertically from the back edge of the horizontal base as illustrated by example shelf 780 of FIG. 8. The rear flange can add rigidity to the shelf and also can serve as an end stop to prevent items from sliding off the back of the shelf By retaining food items in place on the shelf, the rear flange also provides the benefits described previously in association with the end stop in that cameras installed within the compartment can more easily capture useful images of food inventory on the shelves. Similar to the rails described in connection with FIGS. 3-5, there can be a rear gap 745 between the rear interior surface of the compartment 713 and the rear flange or rear edge of the shelf. The previous description of the rear gap 345 in connection with FIG. 4 also applies to the rear gap 745.

FIG. 9 provides a view of the compartment 307 similar to that of FIG. 8, but with the right rear pilaster 771 removed. With the right rear pilaster 771 removed, the tab 785 extending from the rear end of the vertical flange 782 of the shelf 780 is visible. The tab 785 fits into the slot 728 to secure the shelf to the right rear pilaster 771. As shown in FIG. 8, the slot has an elongated shape with an exterior edge closest to the side facing member 728 and an interior edge closest to the center of the compartment 713. The tab 785 slides into the slot between the exterior edge and the interior edge. The exterior edge of the slot 728 can be co-planar with the face 786 of the right front pilaster 770 so that the planar shape of the vertical flange 782 fits against the face 786 (at the front end of the vertical flange 782) and into the slot 328 (at the rear end of the vertical flange 782).

The tab 785 can rest in the slot 728 and easily slide in and out of the slot, without requiring a tool such as a screwdriver. As described in connection with the slot and tab of FIGS. 4 and 5, the slot and tab arrangement simplifies quick installation and removal of the shelf so that the compartment can be rearranged with shelves and rails as needed. At the front end of the vertical flange 782, aperture 731 receives fastener 724 to lock the shelf 780 into place. It should be understood that additional shelves and rails can be installed in compartment 713 and the other compartments of cabinet 705 in a similar manner to that described in connection with FIGS. 3-6 and FIGS. 7-9.

For any apparatus shown and described herein, one or more of the components may be omitted, added, repeated, and/or substituted. Accordingly, embodiments shown in a particular figure should not be considered limited to the specific arrangements of components shown in such figure. Further, if a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure.

Referring generally to the examples herein, any components of the apparatus (e.g., the pilasters, the shelves, the rails), described herein can be made from a single piece (e.g., as from a mold, injection mold, die cast, 3-D printing process, extrusion process, stamping process, or other prototype methods). In addition, or in the alternative, a component of the apparatus can be made from multiple pieces that are mechanically coupled to each other. In such a case, the multiple pieces can be mechanically coupled to each other using one or more of a number of coupling methods, including but not limited to epoxy, welding, fastening devices, compression fittings, mating threads, and slotted fittings. One or more pieces that are mechanically coupled to each other can be coupled to each other in one or more of a number of ways, including but not limited to couplings that are fixed, hinged, removeable, slidable, and threaded.

The terms "coupled" and "couplings" can refer to components that are coupled directly together as well as components that are coupled indirectly and have intervening components. Terms such as "first", "second", "top", "bottom", "side", "distal", "proximal", and "within" are used merely to distinguish one component (or part of a component or state of a component) from another. Such terms are not meant to denote a preference or a particular orientation, and are not meant to limit the embodiments described herein. In the example embodiments described herein, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Although example embodiments are described herein, it should be appreciated by those skilled in the art that various modifications are well within the scope of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A climate controlled food storage system within a vehicle, the climate controlled food storage system comprising:
   a cabinet forming a cavity;
   left and right front pilasters coupled to an interior surface of the cabinet, wherein each of the left and right front pilasters comprise a plurality of fasteners, and wherein each of the plurality of fasteners are configured to secure a vertical flange of a rail to a face of the left and right front pilasters;
   left and right rear pilasters coupled to the interior surface of the cabinet, wherein each of the left and right rear pilasters comprise a side facing member and a front facing member, wherein the side facing member is coupled to the interior surface of the cabinet, and wherein the front facing member comprises a plurality of slots configured to receive a tab of the vertical flange of the rail; and
   a first rail attached to the left front pilaster and the left rear pilaster, the first rail comprising a first vertical flange and a first horizontal flange,
      wherein the first vertical flange comprises a first aperture that receives a first fastener of the plurality of fasteners to secure the first rail to the face of the left front pilaster, and
      wherein the first vertical flange comprises a first tab extending from a rear of the first vertical flange and disposed in a first slot of the plurality of slots of the front facing member of the left rear pilaster.

2. The climate controlled food storage system of claim 1, wherein the first tab rests in the first slot.

3. The climate controlled food storage system of claim 2, wherein the first slot comprises an exterior edge and an interior edge, wherein the exterior edge is co-planar with the face of the left front pilaster.

4. The climate controlled food storage system of claim 3, wherein the first horizontal flange comprises an end stop extending vertically from a rear of the first horizontal flange.

5. The climate controlled food storage system of claim 4, wherein when the first rail is attached to the left front pilaster and the left rear pilaster, a rear gap between an outer side surface of the end stop and a closest rear interior surface of the cabinet has a shortest distance of between ¼ inch and 2 inches to promote air circulation.

6. The climate controlled food storage system of claim 5, wherein when the first rail is attached to the left front pilaster and the left rear pilaster, a side gap between an outer side surface of the first vertical flange and a closest side interior surface of the cabinet has a shortest distance of between ¼ inch and 2 inches to promote air circulation.

7. The climate controlled food storage system of claim 6, further comprising one or more cameras mounted on the interior surface of the cabinet, the one or more cameras configured to capture images of food items stored in the cabinet and to transmit the images of the food items to an onboard computing system for inventory management.

8. The climate controlled food storage system of claim 1, wherein a top surface of the first horizontal flange and an inner side surface of the first vertical flange form an angle that is between 80 degrees and 89 degrees.

9. The climate controlled food storage system of claim 1, further comprising a second rail attached to the right front pilaster and the right rear pilaster, the second rail comprising a second vertical flange and a second horizontal flange, wherein the second vertical flange comprises a second aperture that receives a second fastener of the plurality of fasteners to secure the second rail to the face of the right front pilaster, and wherein the second vertical flange comprises a second tab extending from a rear of the second vertical flange and disposed in a second slot of the plurality of slots of the front facing member of the right rear pilaster.

10. The climate controlled food storage system of claim 9, wherein the first rail and the second rail form a horizontal plane and wherein the first rail and the second rail can interchangeably support a pan and a bin.

11. The climate controlled food storage system of claim 10, further comprising:
- a shelf mounted above or below the first rail and the second rail, the shelf comprising a horizontal base, a left vertical flange, and a right vertical flange,
- wherein the left vertical flange comprises a left aperture that receives a third fastener to secure the shelf to the face of the left pilaster and a left tab extending from a rear of the left vertical flange into a third slot of the front facing member of the left rear pilaster, and
- wherein the right vertical flange comprises a right aperture that receives a fourth fastener to secure the shelf to the face of the right pilaster and a right tab extending from a rear of the right vertical flange into a fourth slot of the front facing member of the right rear pilaster.

12. The climate controlled food storage system of claim 11, wherein
- a rear of the shelf is lower than a front of the shelf,
- the rear of the first vertical flange is lower than a front of the first vertical flange of the first rail; and
- the rear of the second vertical flange is lower than a front of the second vertical flange of the second rail.

13. The climate controlled food storage system of claim 9,
- wherein the first rail can be removed by removing the first fastener and sliding the first tab from the first slot, and
- wherein the second rail can be removed by removing the second fastener and sliding the second tab from the second slot.

14. The climate controlled food storage system of claim 1, wherein the plurality of fasteners of the left and right front pilasters have vertical spacing that is symmetrical from a top to a bottom of each of the left and right front pilasters.

15. The climate controlled food storage system of claim 14, wherein the slots of the left and right rear pilasters have vertical spacing that is symmetrical from a top to a bottom of each of the left and right rear pilasters.

16. The climate controlled food storage system of claim 1, wherein the left and right front pilasters and the left and right rear pilasters form a first vertical array.

17. The climate controlled food storage system of claim 16, further comprising second left and right front pilasters and second left and right rear pilasters forming a second vertical array.

* * * * *